(12) United States Patent
Suzuki et al.

(10) Patent No.: US 8,054,510 B2
(45) Date of Patent: Nov. 8, 2011

(54) DOCUMENT READING METHOD, DOCUMENT READER, IMAGE FORMING DEVICE, AND IMAGE SCANNER

(75) Inventors: Makoto Suzuki, Chiba (JP); Masaaki Yoshida, Chiba (JP)

(73) Assignee: Seiko I Infotech Inc. (JP)

( * ) Notice: Subject to any disclaimer, the term of this patent is extended or adjusted under 35 U.S.C. 154(b) by 1227 days.

(21) Appl. No.: 11/665,202

(22) PCT Filed: Sep. 30, 2005

(86) PCT No.: PCT/JP2005/018075
§ 371 (c)(1),
(2), (4) Date: Apr. 23, 2007

(87) PCT Pub. No.: WO2006/046381
PCT Pub. Date: May 4, 2006

(65) Prior Publication Data
US 2007/0285730 A1 Dec. 13, 2007

(30) Foreign Application Priority Data
Oct. 29, 2004 (JP) .................... 2004-317071

(51) Int. Cl.
*H04N 1/40* (2006.01)
*H04N 1/04* (2006.01)

(52) U.S. Cl. ........ 358/461; 358/498; 358/496; 358/482; 382/274

(58) Field of Classification Search .................. 358/461, 358/498, 496, 482, 374
See application file for complete search history.

(56) References Cited

U.S. PATENT DOCUMENTS

| | | | | |
|---|---|---|---|---|
| 4,734,787 A * | 3/1988 | Hayashi | ........................ | 358/409 |
| 5,115,327 A | 5/1992 | Ishima | ........................ | 358/461 |
| 5,214,520 A | 5/1993 | Miyazawa | ................... | 358/461 |
| 5,802,217 A | 9/1998 | Suzuki et al. | ................. | 382/274 |
| 6,356,735 B1 * | 3/2002 | Hozumi | ........................ | 399/395 |
| 6,563,938 B1 | 5/2003 | Harada | ........................ | 382/108 |
| 7,102,797 B2 * | 9/2006 | Sakai | ........................... | 358/461 |
| 2003/0142367 A1 * | 7/2003 | Ito | ................................ | 358/461 |

(Continued)

FOREIGN PATENT DOCUMENTS
EP 0286414 10/1988
(Continued)

*Primary Examiner* — Sudhanshu Pathak
*Assistant Examiner* — Huo Long Chen
(74) *Attorney, Agent, or Firm* — Adams & Wilks

(57) ABSTRACT

A document reader comprises line sensors that are staggeredly arranged and read a white reference plate to obtain a white reference read value A, and a white reference average value AA is determined from value A for each line sensor. The line sensors read another white reference plate placed on a document support plate to obtain a white reference read value B, and a white reference read average value BB is determined from value B for each line sensor. A sensitivity effect coefficient C for each line sensor is determined by dividing BB by AA. Using the line sensors, there are obtained a document read value E for each line sensor by reading an illuminated document on the document support plate, a white reference read value Aa by reading with the white reference plate before reading the document, and a black reference read value D by reading the white reference plate under a condition that an illumination is turned off before reading of the document. Shading for the line sensors is corrected using the coefficient C, the values Aa, D and E, and a number of gradation levels for image regions corresponding to read areas of the document.

13 Claims, 4 Drawing Sheets

U.S. PATENT DOCUMENTS

| | | | |
|---|---|---|---|
| 2003/0147111 A1 | 8/2003 | Steinebach | 358/509 |
| 2004/0223192 A1* | 11/2004 | Hiromatsu et al. | 358/474 |
| 2005/0134937 A1* | 6/2005 | Cholewo et al. | 358/461 |

FOREIGN PATENT DOCUMENTS

| | | |
|---|---|---|
| JP | 64 19865 | 1/1989 |
| JP | 64019865 | 1/1989 |
| JP | 03096171 A * | 4/1991 |
| JP | 5122527 | 5/1993 |
| JP | 05122527 | 5/1993 |
| JP | 05207232 | 8/1993 |
| JP | 5207232 | 8/1993 |
| JP | 2001136346 | 5/2001 |
| JP | 2004214834 | 7/2004 |

* cited by examiner

DOCUMENT READING METHOD, DOCUMENT READER, IMAGE FORMING DEVICE, AND IMAGE SCANNER

TECHNICAL FIELD

The present invention relates to a document reading method and a document reader for reading image information on a document using line sensors, and to an image scanner for outputting image information on a read document to outside and an image forming device such as a copier and a facsimile for copying image information on a read document.

BACKGROUND ART

Conventionally, there is known a document reader in which a plurality of line sensors are arranged in a zigzag manner in a copier or the like, whereby a first row and a second row of the line sensors extending in a main scanning direction are formed, a document is read with the first row of line sensors in advance, and subsequent to the first row, the document is read with the second row of line sensors shifted in a sub-scanning direction with respect to the first row (e.g., see JP 2004-214834 A and JP 2004-215011 A).

Further, there is disclosed a technique of correcting shading so as to enhance a dynamic range of output data of each photoelectric conversion element by suppressing the influence of a variation in characteristics of a number of photoelectric conversion elements arranged in the main scanning direction of the line sensors (e.g., see JP 5-122527 A).

The shading correction for each photoelectric conversion element is performed using the following expression.

Number of gradation levels×(Document read value−
Black reference read value)/(White reference
read value−Black reference read value)

In this expression, the white reference read value represents read data obtained by reading a white reference plate placed apart on an opposite side of the line sensors with respect to a transparent document support plate with each photoelectric conversion element of the line sensors under illumination. The black reference read value represents read data obtained by reading the white reference plate respectively with each photoelectric conversion element of the line sensors under the condition that illumination is off. The document read value represents read data obtained by reading a document on a document support respectively with each photoelectric conversion element of the line sensors under illumination. The number of gradation levels is represented by a gray gradation in which each read data (output voltage value) is generally associated with digital data in 255 stages.

In the document reader for reading a document using line sensors arranged in the zigzag manner, it is very difficult to arrange a plurality of line sensors with the distances to the document support plate being exactly the same. The variation in distances is caused by the variation in a size tolerance of $\mu$ order for each line sensor, the size tolerance of the thickness of a base and a document support plate on which a plurality of line sensors are set, and the distortion thereof.

If there is a variation in distances of each line sensor with respect to the document support plate, for example, as represented by a case where a document whose image all over the surface thereof is previously known to be a gray gradation is read with each line sensor, it is found that a document read value of a photoelectric conversion element read from each line sensor that divides and scans this document in a main scanning direction varies. Therefore, for example, in an image forming device such as a copier in which an image is formed based on a document read value read by a photoelectric conversion element of each line sensor, gradation occurs for each image region corresponding to a read area of the line sensors arranged in the zigzag manner, which is not preferable in terms of the quality of an image.

However, in any of JP 2004-214834 A and JP 2004-215011 A, there is no description regarding the problem caused by the variation in distance of each line sensor with respect to the document support plate and the countermeasure against the problem. Further, even if the shading correction described in Patent Document 3 is performed, the variation in a document read value read from the photoelectric conversion element of each line sensor cannot be reduced.

An object of the present invention is to obtain a document reader capable of suppressing the variation in document read values read from the photoelectric conversion element of each line sensor irrespective of the variation in distance of each line sensor with respect to a document support plate.

SUMMARY OF THE INVENTION

The present invention relates to a document reading method of reading a document by using a document reader including: a plurality of line sensors arranged in a zigzag manner forming a first row to read the document in advance and a second row to read the document following the first row; a transparent document support plate covering the line sensors; and a white reference plate placed apart from the document support plate on an opposite side of the respective line sensors with respect to the document support plate and forming a reference of a gray gradation, the document being on the document support plate.

Further, in order to achieve the above-mentioned object, the document reading method according to the present invention includes the steps of: reading, by each of the line sensors, the white reference plate that is illuminated to obtain a white reference read value A of a photoelectric conversion element of each of the line sensors, and reading, by each of the line sensors, another white reference plate that is illuminated and placed on the document support plate to obtain a white reference read value B of the photoelectric conversion element of each of the line sensors; averaging the white reference read value A of the photoelectric conversion element for each of the line sensors individually to obtain a white reference read average value AA for each of the line sensors, and averaging the white reference read value B of the photoelectric conversion element for each of the line sensors respectively to obtain a white reference read average value BB for each of the line sensors; dividing the white reference read average value BB by the white reference read average value AA to obtain a sensitivity offset coefficient C for each of the line sensors; and correcting shading for each of the line sensors, by using: a black reference read value D of the photoelectric conversion element of each of the line sensors obtained by reading the white reference plate with each of the line sensors under a condition that illumination is turned off immediately before reading of the document; a white reference read value Aa obtained by reading the illuminated white reference plate immediately before reading of the document; the sensitivity offset coefficient C; and a document reading value E of the photoelectric conversion element of each of the line sensors obtained by reading the illuminated document with each of the line sensors, by an expression:

Number of gradation levels×[(Document read value
E−Black reference read value D)/[(White reference read value Aa×Sensitivity offset coefficient
C)−Black reference read value D].

According to the present invention, the sensitivity offset coefficient C is obtained for each line sensor, by using the white reference read average value AA obtained for each line sensor from the white reference read value A obtained when the photoelectric conversion element of each line sensor reads the white reference plate and the white reference read average value BB obtained for each line sensor from the white reference read value B obtained when the same photoelectric conversion element reads the another white reference plate placed on the document support plate. The sensitivity offset coefficient C is a constant for setting sensitivities varying depending upon the distance of each line sensor with respect to the document support plate to be constant, and the white reference read value in shading correction is corrected depending upon the variation in distance of each line sensor with respect to the document support plate with the sensitivity offset coefficient C. Because of this, according to the method of the present invention, irrespective of the variation in distance of each line sensor with respect to the document support plate, the variation in document read value read from the photoelectric conversion element of each line sensor can be suppressed based on the difference in read area of each line sensor arranged in the zigzag manner.

Further, the present invention relates to a document reader which includes: a plurality of line sensors arranged in a zigzag manner forming a first row to read the document in advance and a second row to read the document following the first row; a transparent document support plate covering the line sensors; and a white reference plate placed apart from the document support plate on an opposite side of the respective line sensors with respect to the document support plate and forming a reference of a gray gradation, for performing shading correction of a document read value E obtained by reading an illuminated document on the document support plate with each of the line sensors, by using: a black reference read value D obtained by reading the white reference plate with a photoelectric conversion element of each of the line sensors under a condition that illumination is turned off immediately before reading of the document; and a white reference read value A obtained by reading an illuminated white reference plate immediately before reading of the document.

Further, in order to achieve the above-mentioned object, the document reader according to the present invention includes: storage means for storing the white reference read value A, the black reference read value D, a white reference read value B obtained by reading another illuminated white reference plate placed on the document support plate with the photoelectric conversion element of each of the line sensors, and a sensitivity offset coefficient C; a read average value calculating portion for averaging the white reference read value A of the photoelectric conversion element for each of the line sensors individually to obtain a white reference read average value AA for each of the line sensors, and averaging the white reference read value B of the photoelectric conversion element for each of the line sensors respectively to obtain a white reference read average value BB for each of the line sensors; an offset coefficient calculating portion for dividing the white reference read average value BB by the white reference read average value AA to obtain the sensitivity offset coefficient C for each of the line sensors; and a shading correcting portion for correcting shading for each of the line sensors by using the white reference read value Aa obtained by reading the illuminated white reference plate immediately before reading of the document, the sensitivity offset coefficient C, the black reference read value D, and the document read value E, by an expression:

Number of gradation levels×[(Document read value E−Black reference read value D)/[(White reference read value Aa×Sensitivity offset coefficient C)−Black reference read value D].

According to the present invention, the above-mentioned document reading method is conducted in which the white reference read value in shading correction is corrected in accordance with the variation in distance of each line sensor with respect to the document support plate, with the sensitivity offset coefficient C for setting the sensitivities varying depending upon the variation in distance of each line sensor with respect to the document support plate to be constant. Therefore, the variation in document read value read from the photoelectric conversion element of each line sensor can be suppressed, based on the difference in read area of each line sensor arranged in the zigzag manner irrespective of the variation in distance of each line sensor with respect to the document support plate.

Further, in order to achieve the above-mentioned object, the image forming device of the present invention is equipped with the document reader as described above. Thus, according to the present invention, an image forming device can be provided, which includes the document reader capable of suppressing the variation in document read value read from the photoelectric conversion element of each line sensor, based on the difference in read area of each line sensor arranged in the zigzag manner, irrespective of the variation in distance of each line sensor with respect to the document support plate.

Further, in order to achieve the above-mentioned object, the image scanner of the present invention is equipped with the document reader as described above. Thus, according to the present invention, an image scanner can be provided, which includes the document reader capable of suppressing the variation in document read value read from the photoelectric conversion element of each line sensor, based on the difference in read area of each line sensor arranged in the zigzag manner, irrespective of the variation in distance of each line sensor with respect to the document support plate.

DETAILED DESCRIPTION OF THE PREFERRED EMBODIMENTS

An embodiment of the present invention will be described with reference to FIGS. 1 to 7.

Figure 1:
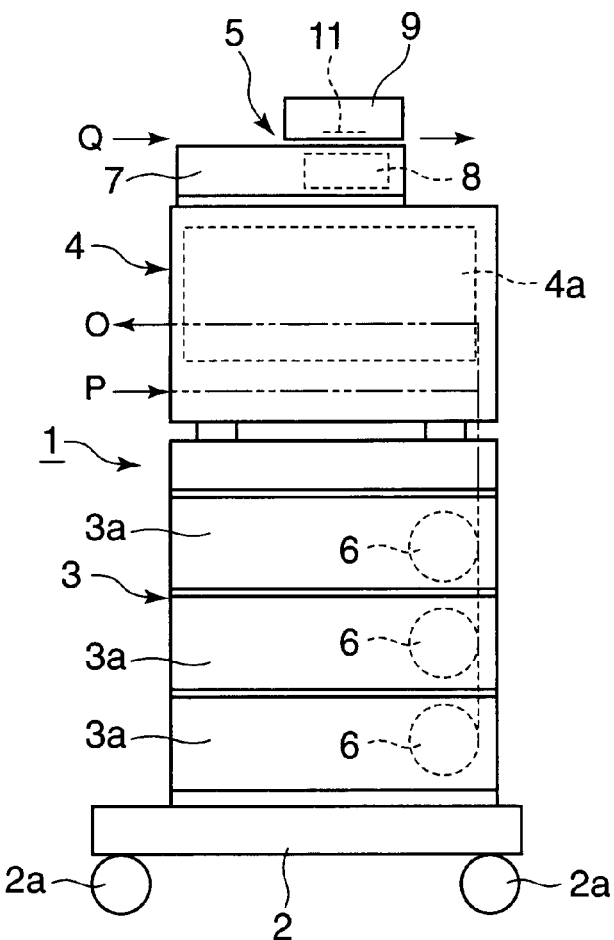
FIG. 1 is a side view schematically showing a copier with a document reader according to an embodiment of the present invention.

Reference numeral 1 of FIG. 1 denotes an image forming device, e.g., an electronic copier. The copier 1 includes a base 2 having a plurality of wheels 2a, a sheet supply portion 3 set on the base 2, an image forming portion 4 set on the sheet supply portion 3, and a document reading portion 5 set on the image forming portion 4.

The sheet supply portion 3 has a plurality of paper feed trays 3a respectively provided with paper feed rollers 6. A sheet accommodated in the paper feed trays 3a is sent to the image forming portion 4 as represented by the arrow O of an alternate long and two short dashes line of FIG. 1, when the paper feed roller 6 rotate, and passes through the image forming portion 4 to be delivered to a front of the copier 1. The arrow P of FIG. 1 represents a movement path of a manually fed sheet supplied manually from a front side of the copier 1, and the manually fed sheet enters an intermediate part of a sheet transport path supplied from the paper feed tray 3a to pass the image forming portion 4.

The image forming portion 4 has an image forming unit 4a through which the sheet passes, and records an image on the sheet in an image forming unit 4a based on digital data of a document image output from the document image reading portion 5.

In the document reading portion 5, a contact-type document reading unit 8 is fixed to a document table 7, and a document table cover 9 covering the upper surface of the document reading unit 8 is attached so as to be opened/closed. A document is supplied from a front side of the copier 1 as represented by the arrow Q of FIGS. 1 and 2 with respect to the document reading portion 5, and passes between the document reading unit 8 and the document table cover 9 to be discharged to a back of the copier 1. The document reading unit 8 photoelectrically reads a document image, and converts the read information into digital data to output the data to the image forming unit 4a.

Figure 2:
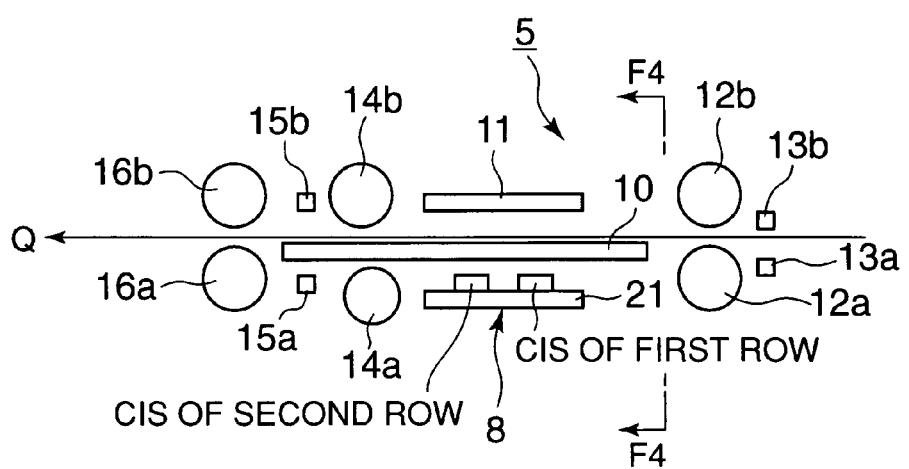
FIG. 2 is a view schematically showing a configuration of the document reader of FIG. 1.

As shown in FIG. 2, the document reading portion 5 has a white reference plate 11 placed apart on an opposite side of the document reading unit 8 with respect to a fixed transparent document support plate 10 covering the document reading unit 8. The document support plate 10 is made of a transparent plate with which a document surface of the document comes into contact, can be preferably made of a glass plate or a transparent synthetic resin plate such as an acryl board, and is fixed to the document table 7. The white reference plate 11 is a white plate forming a reference of a gray gradation, is fixed to the document table cover 9, and is placed above the document reading unit 8 so as to be opposed thereto as shown in FIG. 2, when the document table cover 9 is closed.

On an upstream side in a movement direction of the document with respect to the document reading unit 8, the document support plate 10, and the white reference plate 11, a pair of delivery rollers 12a, 12b that rotate to come into contact with each other are provided, and further, a projector 13a and a light-receiving unit 13b that form a transmission-type inlet sensor for detecting the leading edge of the document to detect the insertion of the document are placed in the vicinity on the upstream side of the delivery rollers 12a, 12b. On a downstream side in the movement direction of the document with respect to the document reading unit 8, the document support plate 10, and the white reference plate 11, a pair of feed rollers 14a, 14b that rotate to come into contact with each other are provided, a projector 15a and a light-receiving unit 15b that form a transmission-type outlet sensor for detecting the leading edge of the document are provided in the vicinity of the downstream side of a feed roller 14, and further, a pair of discharge rollers 16a, 16b that rotate to come into contact with each other are positioned in the vicinity on the downstream side of the output sensor.

The delivery roller 12a, the projectors 13a, 15a, the feed roller 14a, and the discharge roller 16a are provided on the document table 7, and the delivery roller 12b, the projectors 13b, 15b, the feed roller 14b, and the discharge roller 16b are provided on the document table cover 9. One of the delivery rollers 12a, 12b is driven, and the other thereof follows. Similarly, one of the discharge rollers 16a, 16b is driven, and the other thereof follows.

When the inlet sensor detects the leading edge of the inserted document, the document reading unit 8 reads the white reference plate 11, and on the other hand, one of the delivery rollers 12a, 12b is rotated, and one of the feed rollers 14a, b for performing exact paper feeding is rotated. When the outlet sensor detects the leading edge of the delivered document, the document starts being read by the document reading unit 8, and one of the discharge rollers 16a, 16b is rotated. Further, when the inlet sensor detects the trailing edge of the inserted document, the rotation of the delivery rollers 12a, 12b is stopped. Similarly, when the outlet sensor detects the trailing edge of the delivered document, the rotation of the feed rollers 14a, 14b and the discharge rollers 16a, 16b is stopped.

Figure 3:
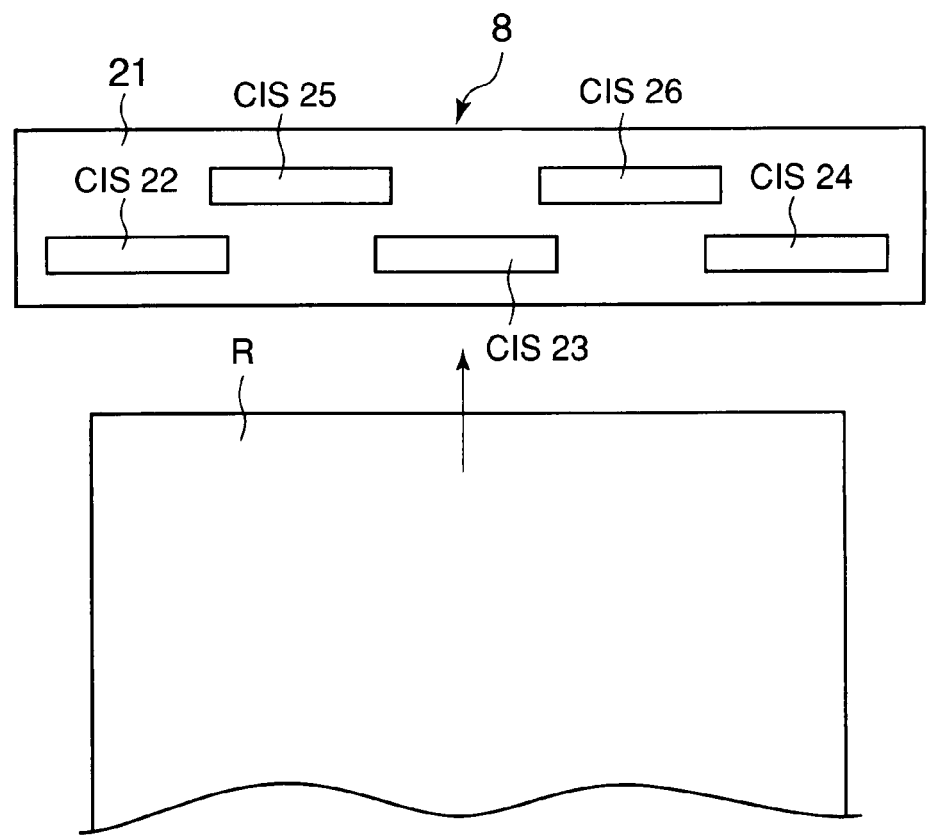
FIG. 3 is a view showing a positional relationship between a document reading unit of the document reader of FIG. 1 and a document.
Figure 4:
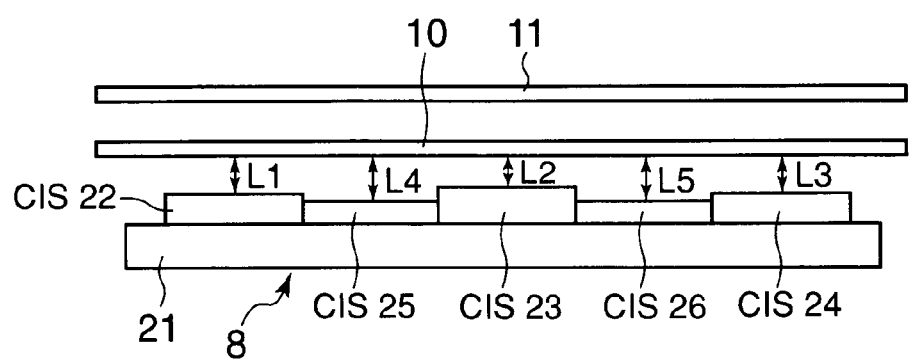
FIG. 4 is a view showing an emphasized positional relationship among the document reading unit, a document support plate, and a white reference plate, taken along the line F4-F4 of FIG. 2.
Figure 7:
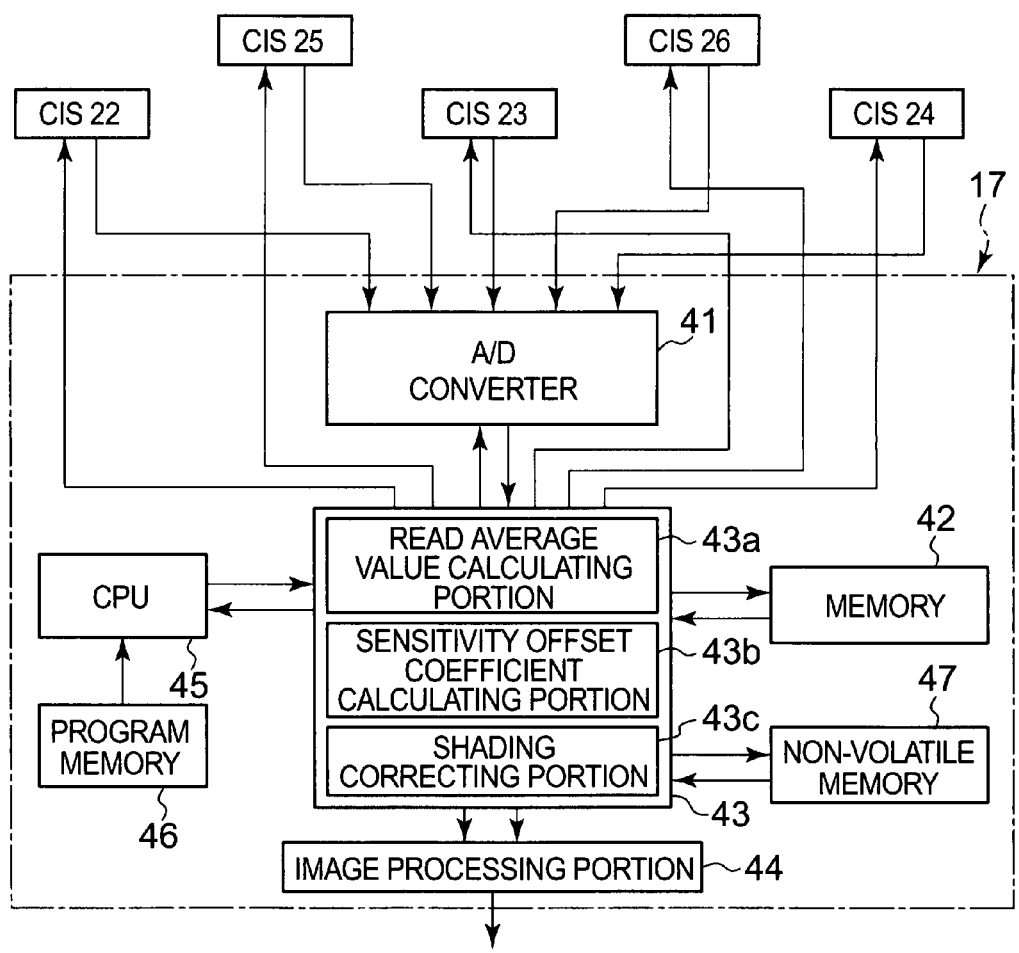
FIG. 7 is a block diagram showing an electric configuration of the document reader of FIG. 1.

The document reader is formed so as to include the document reading unit 8, the document support plate 10, the white reference plate 11, and a control portion 17 shown in FIG. 7. In the document reading unit 8 of the document reader, a plurality of (e.g., five) line sensors CIS22 to CIS26, and the document support plate 10 are supported on a unit base 21 as shown in FIG. 3. Further, the document reading unit 8 and the document support plate 10 form a contact-type image sensor.

The line sensors CIS22 to CIS26 are arranged in a zigzag manner, forming first and second rows at a predetermined distance in a sub-scanning direction. The first row is composed of the line sensors CIS22 to CIS24 arranged in a main scanning direction for each predetermined distance, and the second row is composed of the line sensors CIS25, CIS26 for a predetermined distance in the main scanning direction. Reference symbol R of FIG. 3 represents a document moved along the upper surface of the document support plate 10, and the document R is divided and scanned in the main scanning direction by the five line sensors CIS22 to CIS26. A focal point of the respective line sensors CIS22 to CIS26 is designated so as to be set on the upper surface of the document support plate 10 or in the vicinity thereof, and the distance between each of the line sensors CIS22 to CIS26 and the document support plate 10 varies depending upon the size tolerance of the respective line sensors CIS22 to CIS26, as represented by reference numerals L1 to L5 in an emphasized manner in FIG. 4.

Figure 5:
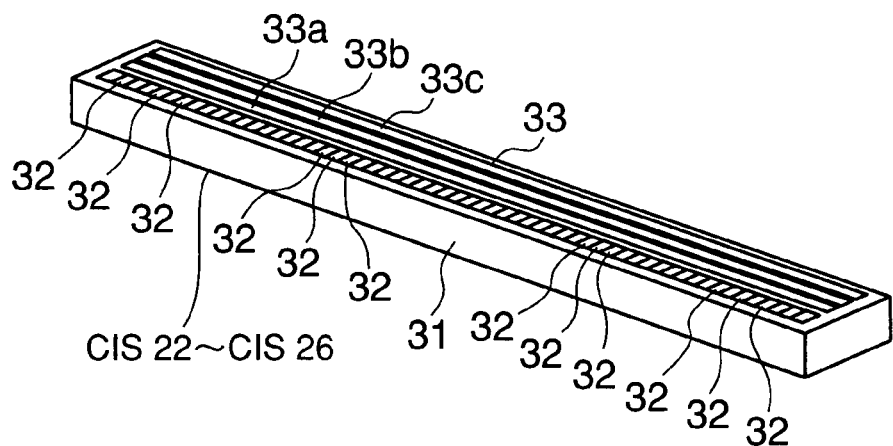
FIG. 5 is a perspective view showing line sensors of the document reader of FIG. 1.

As shown in FIG. 5, the respective line sensors CIS22 to CIS26 are integrated in such a manner that a number of photoelectric conversion elements 32, illumination means 33, and the like are attached to a sensor insulator 31 made of elongated synthetic resin. A number of photoelectric conversion elements 32 are arranged in a longitudinal direction of the sensor insulator 31, in other words, arranged in a row in the main scanning direction. The illumination means 33 is composed of, for example, respective light-emitting diode rows of red, green, and blue (not shown) contained in the sensor insulator 31, and light guides 33a to 33c provided on the upper surface of the sensor insulator 31 so as to be opposed individually to the light-emitting diode rows. The respective light-emitting diode rows and the light guides 33a to 33c forming a light source extend in the main scanning direction. A white light-emitting diode can also be used for the light source of the illumination means 33.

As shown in FIG. 7, the control portion 17 is composed of, for example, a microcomputer, and includes an A/D converter 41, a memory 42, data processing means such as a data processing portion 43, image processing means such as an image processing portion 44, control means such as a CPU 45, a program memory 46, storage means such as a nonvolatile memory 47, e.g., an EEPROM1

The A/D converter 41 receives analog data read from the photoelectric conversion elements 32 of the respective line sensors CIS22 to CIS26. The A/D converter 41 converts the input analog data into digital data, and sends the data to the data processing portion 43. Parameters for determining a sampling frequency and a reference value of the A/D converter 41 are controlled by the data processing portion 43.

The memory 42 is formed of an SDROM (secure digital random access memory) or an SRAM (static random access memory). Various kinds of data are stored in the memory.

The data processing portion 43 is formed of an ASIC (application specific integrated circuit) such as a gate array or an FPGA. A sensor control portion (not shown) of the data processing portion 43 controls reading of data from the photoelectric conversion elements 32 of the respective line sensors CIS22 to CIS26. Due to the reading control, a voltage (analog data) in accordance with a light receiving amount of the photoelectric conversion elements 32 is serially output from one end to the other end of the row of the photoelectric conversion elements 32, so as to correspond to the transfer period controlled by the data processing portion 43, starting from a pulse (TR) generated by the data processing portion 43 for each line period.

A lighting control portion (not shown) of the data processing portion 43 controls lighting of the light source. In this case, the respective light-emitting diodes of red, green, and blue are lit simultaneously, whereby white light suitable for forming a monochromic image is radiated to the back surface of the document support plate 10. In the case of the application for forming a color image, the lightings of the respective light-emitting diodes of red, green, and blue are shifted in terms of time in one line period to be independent, and photoelectric conversion data of the row of the photoelectric conversion elements 32 is transferred three times in one line period, whereby gradation values independent for R, G, and B can also be obtained.

The data processing portion 43 includes a read average value calculating portion 43a, a sensitivity offset coefficient calculating portion 43b, and a shading correcting portion 43c, described later. Further, the data processing portion 43 has one-line control portion (not shown). The one-line control portion once stores data subjected to shading correction in the memory 42, reads one line of data from the memory 42 when the one line of data becomes complete, considering a delay time among line sensors having different positions in the sub-scanning direction, combines data among the different line sensors, cut out a required range, and sends one line of data obtained from the required range to the image processing portion 44.

The image processing portion 44 performs size adjustment of enlarging or reducing input data, adjustment of tone such as brightness and contrast, binaryzation, and the like if required, thereby forming image data. The data processed in the image processing portion 44 is transferred to the outside of the document reading portion 5, i.e., the image forming unit 4a in this embodiment through an interface (not shown). As the interface, a USB (universal serial bus), an IEEE 1394 (Institute of Electrical and Electronics Engineers 1394), or an SCSI (small computer system interface), or the like can be used.

The CPU 45 controls the general operation of the document reader. The respective line sensors CIS22 to CIS26, the A/D converter 41, the memory 42, and the image processing portion 44 are respectively provided with registers determining each operation, and the values thereof can be set by the CPU 45 through the data processing portion 43. The program memory 46 is formed of a flash memory or the like, and stores a program determining the operation of the CPU 45. When the document reading portion 5 of the copier 1 is switched on, the program is read by the CPU 45, whereby the operation of the document reader is started.

The read average value calculating portion 43a and the sensitivity offset coefficient calculating portion 43b of the data processing portion 43 are provided so as to obtain a correction value for offsetting the sensitivity of the photoelectric conversion elements 32 caused by the difference in reflection position of light between the white reference plate 11 and the document R for shading correction to an apparent focal position, in the shading correction for enhancing the dynamic range of read data of the photoelectric conversion elements 32 of the respective line sensors CIS22 to CIS26.

More specifically, the read average value calculating portion 43a functions at a time of adjustment during production of the document reader. Prior to the processing in the read average value calculating portion 43a, first, the respective line sensors CIS22 to CIS26 are allowed to receive reflected light from the white reference plate 11 illuminated with the illumination means 33, and the photoelectric conversion elements 32 of the line sensors CIS22 to CIS26 are scanned, whereby a read value (referred to as a white reference read value A) is obtained. Further, the fixed white reference plate 11 and another white reference plate (not shown) of the same kind as that of the fixed white reference plate 11 are placed on the document support plate 10 manually, and in this state, the respective line sensors CIS22 to CIS26 are allowed to receive light reflected by another white reference plate illuminated with the illumination means 33, and the photoelectric conversion elements 32 of the line sensors, CIS22 to CIS26 are scanned, whereby a read value (referred to as a white reference read value B) is obtained. The white reference read values A, B are converted into digital data representing a gray gradation in accordance with the voltage values and stored in the memory 42.

Figure 6:
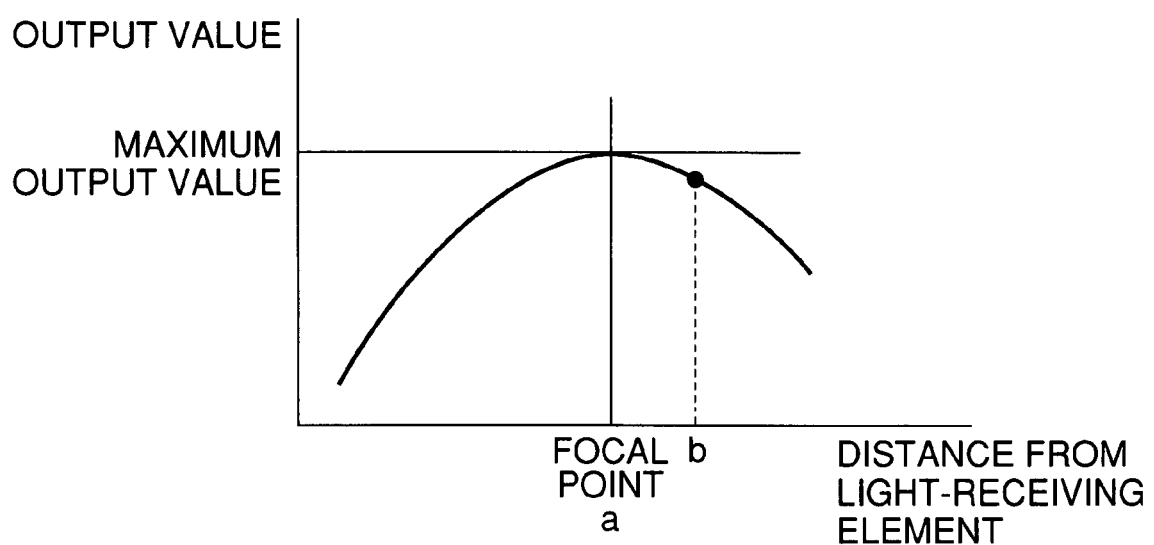
FIG. 6 is a characteristic diagram showing a sensitivity of light-receiving elements of the line sensors of FIG. 5 with respect to the distance.

The white reference read value B obtained in the above-mentioned procedure corresponds to a read value at a focal position a of FIG. 6, and the white reference read value A corresponds to a read value at the position shifted from the focal position a, e.g., the position represented by reference symbol b of FIG. 6. The white reference read values A, B represent the magnitude of an output of the photoelectric conversion elements 32, in other words, the sensitivity of the photoelectric conversion elements 32 caused by the difference in a reflection position, and the white reference read value A is smaller than the white reference read value B.

Averaging in the read average value calculating portion 43a is performed based on the thus obtained white reference read values A, B. In this processing, the white reference read values A of the respective photoelectric conversion elements 32 stored in the memory 42 are read, the white reference read values A are averaged for each of the line sensors CIS22 to CIS26, and a white reference read average value AA is obtained for each of the line-sensors CIS22 to CIS26. Together with this, the white reference read values B of the respective photoelectric conversion elements 32 stored in the memory 42 are read, the white reference read values B are averaged individually for each of the line sensors CIS22 to CIS26, and a white reference read average value. BB is obtained for each of the line sensors CIS22 to CIS26. Due to this averaging, the variation in the white reference read values A and the white reference read values B of the respective photoelectric conversion elements 32 for each of the line sensors CIS22 to CIS26 can be averaged.

In the sensitivity offset coefficient calculating portion 43b, the ratio between the white reference read average value AA and the white reference read average value BB is obtained. That is, the white reference read average value BB is divided by the white reference read average value AA. Due to this processing, a correction value for allowing the white reference read value A at the position b shifted from the focal position a shown in FIG. 6 correspond to the read value at the focal position a, i.e., a sensitivity offset coefficient C can be obtained. The sensitivity offset coefficient C is obtained for each of the line sensors CIS22 to CIS26, as is apparent from the procedure described above. The sensitivity offset coefficient C peculiar to each of the line sensors CIS22 to CIS26 is stored in the non-volatile memory 47, and is read to be used for correction processing in the shading correcting portion 43c.

The shading correcting portion 43c performs shading correction for enhancing a dynamic range of output data of each photoelectric conversion element 32 of each of the line sensors CIS22 to CIS26. This correction is preferably performed in the case of actually reading a document in practical use of the document reading portion 5, e.g., for each reading of a document, but this correction can also be performed for each predetermined document read number.

In this shading correction, the white reference read value Aa obtained by reading the white reference plate 11 immediately before actual reading of a document is multiplied by the sensitivity offset coefficient C read from the memory 47, whereby a white reference read value used in shading correction is obtained. The white reference read value Aa means that the color tone of the white reference plate 11 changes with time or the like, compared with the production stage of the document reader, and consequently a read value may change. Thus, the shading correcting portion 43c performs shading correction in accordance with the following expression, using the white reference read value corrected for sensitivity, a black reference read value D, and a document read value E for each photoelectric conversion element 32 of the line sensors CIS22 to CIS26 that have actually read a document.

In the expression $N \times [(E-D)/(Aa \times C) - D]$, N represents the number of gradation levels, Aa represents a white reference read value of the white reference plate 11 immediately before actual reading of a document as described above, C represents a sensitivity offset coefficient, D represents a black reference read value of the white reference plate 11 under the condition that the illumination is turned off immediately before reading of the read document, and E represents a document read value. Further, the number of gradation level N is a conversion stage number from analog data to digital data by the A/D converter 41, and the general numerical value thereof is 255.

To multiply the white reference read value Aa obtained by actually reading the white reference plate 11 by the sensitivity offset coefficient C in the above-mentioned shading correction is to correct the reading sensitivity in accordance with the variation in distance of the respective lines sensors CIS22 to CIS26 with respect to the white reference plate 11 or the document support plate 10 with the sensitivity offset coefficient C peculiar to each of the line sensors CIS22 to CIS26. Thus, owing to the above-mentioned correction, irrespective of the variation in distance of the respective line sensors CIS22 to CIS26 with respect to the document support plate 10, as represented by the case where a document having an image all over the surface thereof is known to be a gray gradation is read with each of the line sensors CIS22 to CIS26, the variation in document read value read from the photoelectric conversion elements 32 of the respective line sensors CIS22 to CIS26 can be suppressed. That is, based on the difference in read area of the respective line sensors CIS22 to CIS26 arranged in a zigzag manner, the variation in document read value read from the photoelectric conversion elements of each line sensor can be suppressed.

Therefore, based on the image data sent to the image forming unit 4a through the image processing portion 44, the variation in gradation can be suppressed from occurring in an image formed by the image forming unit 4a, for each image region corresponding to the read area of each of the line sensors CIS22 to CIS26, whereby the quality of a formed image can be enhanced.

Figure 8:
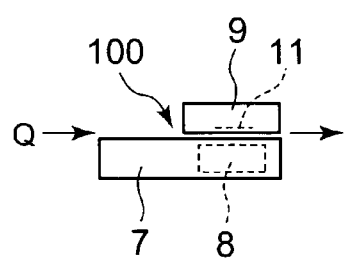
FIG. 8 is a side view schematically showing an image scanner with a document reader according to another embodiment of the present invention.

FIG. 8 shows another embodiment of the present invention. This embodiment shows an example in which the document reading portion 5 of the copier 1 shown in FIG. 1 is made independent as an image scanner 100. Thus, the configuration of the image scanner 100 is the same as that of the document reading portion 5, so that the same components as those in the document reading portion 5 are denoted with the same reference numerals as those therein and the description thereof are omitted. Even in the image scanner 100, the problem of the present invention can be solved by the same function as that of the above-mentioned embodiment.

The present invention is not constricted by each of the above-mentioned embodiments. For example, the present invention is applicable to a document-fixed-type document reader in which a document is fixed on a document support plane and line sensors are moved with respect to the document, as well as a document-movement-type document reader as in the embodiments of the present invention.

INDUSTRIAL APPLICABILITY

According to the present invention, a white reference read value used for shading correction is corrected for each line sensor in accordance with the variation in distance, with a sensitivity offset coefficient for setting the sensitivities varying depending upon the distance of each line sensor with respect to a document support plate to be constant, so that a document reading method and a document reader can be provided, which are capable of suppressing the variation in document read value read from the photoelectric conversion elements of respective line sensors irrespective of the variation in distance of each line sensor with respect to the document support plate.

Further, according to the present invention, an image forming device with a document reader capable of suppressing the variation in document read value read from the photoelectric conversion elements of respective line sensors irrespective of the variation in distance of each line sensor with respect to the document support plate can be provided.

Further, according to the present invention, an image scanner with a document reader capable of suppressing the variation in document read value read from the photoelectric conversion elements of respective line sensors irrespective of the variation in distance of each line sensor with respect to the document support plate can be provided.

The invention claimed is:

1. A document reading method comprising:
providing a document reader comprising a plurality of line sensors arranged in a zigzag manner to form a first row of line sensors having photoelectric conversion elements that read a document in advance and a second row of line sensors having a plurality of photoelectric conversion elements that read the read areas of the document following reading thereof by the photoelectric conversion elements of the first row of line sensors; a transparent document support plate that supports the document and covers the line sensors so that the line sensors are disposed on one side of the document support plate at preselected variable distances from a surface of the document support plate; a first white reference plate spaced apart from the document support plate and disposed on a side of the document support plate opposite to the side thereof on which the line sensors are disposed, the first reference plate forming a reference of gray gradation; and a second white reference white plate disposed on the document support plate;

using the photoelectric conversion element of each of the line sensors, reading the first white reference plate while illuminating the first white reference plate to obtain a white reference read value A of the photoelectric conversion element for each of the line sensors corresponding to a read value at a focal position, and reading the second white reference plate while illuminating the second white reference plate to obtain a white reference read value B of the photoelectric conversion element for each of the line sensors corresponding to a read value at a focal position shifted from the focal position corresponding to the white reference read value A, the white reference read value A being smaller than the white reference read value B;

averaging the white reference read value A of the photoelectric conversion element obtained for each of the line sensors to obtain a white reference read average value AA for each of the line sensors, and averaging the white reference read value B of the photoelectric conversion element for each of the line sensors to obtain a white reference read average value BB for each of the line sensors;

dividing the white reference read average values BB obtained for the line sensors by the respective white reference read average values AA obtained for the line sensors to obtain a sensitivity offset coefficient C for each of the line sensors for offsetting variations in sensitivities of the photoelectric conversion elements of the line sensors due to the variation in distances from the line sensors to the surface of the document support plate; and for each of the line sensors, correcting shading using the expression $N \times [(E-D)/(Aa \times C) - D]$, where N represents the number of gradation levels for image regions corresponding to read areas of the document read by the photoelectric conversion elements of the line sensors; D represents a black reference read value of the photoelectric conversion element of each of the line sensors obtained by reading the first white reference plate using the photoelectric conversion element of each of the line sensors under a condition that illumination is turned off immediately before reading of the document; Aa represents a white reference read value of the photoelectric conversion element of each of the line sensors obtained by reading the illuminated white first reference plate using the photoelectric conversion element of each of the line sensors immediately before reading of the document; C represents the sensitivity offset coefficient obtained for each of the line sensors; and E represents a document read value of the photoelectric conversion element of each of the line sensors obtained by reading the illuminated document using the photoelectric conversion element of each of the line sensor.

2. A document reader comprising:
a document reading portion comprising:
a plurality of line sensors arranged in a zigzag manner to form a first row of line sensors having photoelectric conversion elements that read in advance read areas of a document and a second row of line sensors having photoelectric conversion elements that read the read areas of the document following reading thereof by the first row of line sensors;
a transparent document support plate that supports the document and covers the line sensors so that the line sensors are disposed on one side of the document support plate at preselected variable distances from a surface of the document support plate; a first white reference plate spaced apart from the document support plate and disposed on a side of the document support plate opposite to the side thereof on which the line sensors are disposed, the first white reference plate forming a reference of gray gradation; and
a second white reference plate disposed on the document support plate;
a processing portion that performs shading correction of a document read value E, obtained by reading an illuminated document on the document support plate with the photoelectric conversion element of each of the line sensors, using a black reference read value D obtained by reading the first white reference plate with the photoelectric conversion element of each of the line sensors under a condition that illumination is turned off immediately before reading of the document, and using a white reference read value A corresponding to a read value at a focal position and obtained by reading, immediately before reading of the document, the first white reference plate with the photoelectric conversion element of the each of the line sensors while the first white reference plate is illuminated, and using a white reference read value B corresponding to a read value at another focal position and obtained by reading the second white reference plate with the photoelectric conversion element of each of the line sensors while the second white reference plate is illuminated, the focal position corresponding to the white reference read value A being smaller than and shifted from the focal position corresponding to the white reference read value B;
a storage portion that stores the white reference read value A, the white reference read value B, the black reference read value D, and a sensitivity offset coefficient C;
a read average value calculating portion that averages the white reference read value A of the photoelectric conversion element for each of the line sensors to obtain a white reference read average value AA for each of the line sensors, and that averages the white reference read value B of the photoelectric conversion element for each of the line sensors to obtain a white reference read average value BB for each of the line sensors;
an offset coefficient calculating portion that divides the white reference read average value BB by the white reference read average value AA to obtain the sensitivity offset coefficient C for each of the line sensors for offsetting variations in sensitivities of the photoelectric conversion elements of the line sensors due to the variation in distances from the line sensors to the surface of the document support plate; and a shading correcting portion that corrects shading for each of the line sensors using the expression N×[(E−D)/(Aa×C)−D], where N represents the number of gradation levels for image regions corresponding to read areas of the document read by the photoelectric conversion elements of the line sensors, E represents the document read value, Aa represents a reference read value obtained by reading the illuminated first white reference plate with the photoelectric conversion element of each of the line sensors immediately before reading of the document, C represents the sensitivity offset coefficient, and D represents the black reference read value.

3. An image forming device having the document reader according to claim 2.

4. An image scanner having the document reader according to claim 2.

5. A document reading method according to claim 1; wherein for each of the line sensors, the sensitivity offset coefficient C comprises a correction value for offsetting sensitivity of the photoelectric conversion element of the line sensor caused by a difference in reflection position of light between the first white reference plate and the document support plate.

6. A document reader according to claim 2; wherein for each of the line sensors, the sensitivity offset coefficient C comprises a correction value for offsetting sensitivity of the photoelectric conversion element of the line sensor caused by a difference in reflection position of light between the first white reference plate and the document support plate.

7. A document reader comprising:
a plurality of line sensors arranged in a zigzag manner to form a first row of line sensors having photoelectric conversion elements that read in advance read areas of a document and a second row of line sensors having photoelectric conversion elements that read the read areas of the document following reading thereof by the first row of line sensors;
a transparent document support plate that supports a document and covers the line sensors so that the line sensors are disposed on one side of the document support plate at preselected variable distances from a surface of the document support plate;
a document table cover disposed above the document support plate;
a first white reference plate integrally connected to the document table cover and spaced apart from and disposed on a side of the document support plate opposite to the side thereof on which the line sensors are disposed, the first white reference plate forming a reference of gray gradation;
a second white reference plate disposed on the document support plate;
a processing portion that performs shading correction of a document read value E, obtained by reading an illuminated document on the document support plate with the photoelectric conversion element of each of the line sensors, using a black reference read value D obtained by reading the first white reference plate with the photoelectric conversion element of each of the line sensors under a condition that illumination is turned off immediately before reading of the document, and using a white reference read value A corresponding to a read value at a focal position and obtained by reading, immediately before reading of the document, the first white reference plate with the photoelectric conversion element of the each of the line sensors while the first white reference plate is illuminated, and using a white reference read value B corresponding to a read value at another focal position and obtained by reading the second white reference plate with the photoelectric conversion element of each of the line sensors while the second white reference plate is illuminated, the focal position corresponding to the white reference read value A being smaller than and shifted from the focal position corresponding to the white reference read value B;
a storage portion that stores the white reference read value A, the white reference read value B, the black reference read value D, and a sensitivity offset coefficient C;
a read average value calculating portion that averages the white reference read value A of the photoelectric conversion element for each of the line sensors to obtain a white reference read average value AA for each of the line sensors, and that averages the white reference read value B of the photoelectric conversion element for each of the line sensors to obtain a white reference read average value BB for each of the line sensors;
an offset coefficient calculating portion that divides the white reference read average value BB by the white reference read average value AA to obtain the sensitivity offset coefficient C for each of the line sensors for offsetting variations in sensitivities of the photoelectric conversion elements of the line sensors due to the variation in distances from the line sensors to the surface of the document support plate; and
a shading correcting portion that corrects shading for each of the line sensors using the expression N×[(E−D)/(Aa×C)−D], where N represents the number of gradation levels for image regions corresponding to read areas of the document read by the photoelectric conversion elements of the line sensors, E represents the document read value, Aa represents a reference read value obtained by reading the illuminated first white reference plate with the photoelectric conversion element of each of the line sensors immediately before reading of the document, C represents the sensitivity offset coefficient, and D represents the black reference read value.

8. A document reader according to claim 7; wherein the document table cover is disposed opposite to the line sensors.

9. A document reader according to claim 7; further comprising an outlet sensor for detecting a leading edge of the document on a downstream side of the first white reference plate.

10. A document reader according to claim 7; wherein for each of the line sensors, the sensitivity offset coefficient C comprises a correction value for offsetting sensitivity of the photoelectric conversion element of the line sensor caused by a difference in reflection position of light between the first white reference plate and the document support plate.

11. An image forming device having the document reader according to claim 7.

12. An image forming device comprising: a document supply portion that supplies a document; an image forming portion that forms an image of the document supplied by the document supply portion; and a document reader according to claim 7 that reads the image formed on the document by the image forming portion.

13. An image scanner having the document reader according to claim 7.

* * * * *